United States Patent [19]

Walters

[11] 4,159,509

[45] Jun. 26, 1979

[54] CATHODE DEPOLARIZER

[75] Inventor: Charles W. Walters, Indianapolis, Ind.

[73] Assignee: P. R. Mallory & Co. Inc., Indianapolis, Ind.

[21] Appl. No.: 803,798

[22] Filed: Jun. 6, 1977

[51] Int. Cl.² ............................................. H01G 9/00
[52] U.S. Cl. ..................................... 361/433; 29/570; 252/62.2
[58] Field of Search .......................... 361/433; 29/570; 252/62.2; 427/80; 148/6.14 R

[56] References Cited

U.S. PATENT DOCUMENTS

| 2,710,369 | 6/1955 | Booe | 361/433 |
| 3,751,797 | 8/1973 | O'Nan et al. | 361/433 |

Primary Examiner—James W. Davie

Attorney, Agent, or Firm—Charles W. Hoffmann; Ronald S. Cornell; Martin M. Glazer

[57] ABSTRACT

An electrical device stabilized for long life operation comprising a cathode electrode including a porous layer of electrically conductive metal containing material, an electrolyte including an inorganic acid contacting the cathode electrode, and a cathode depolarizer including copper salt. A method of depolarizing an electrical device comprising the steps of forming a cathode electrode of layers of materials including a porous layer of electrically conductive metal containing material, contacting the cathode electrode with an electrolyte including an inorganic acid and a depolarizer including copper salt, reducing the copper salt to copper, and depositing copper on the cathode electrode as copper metal.

14 Claims, 1 Drawing Figure

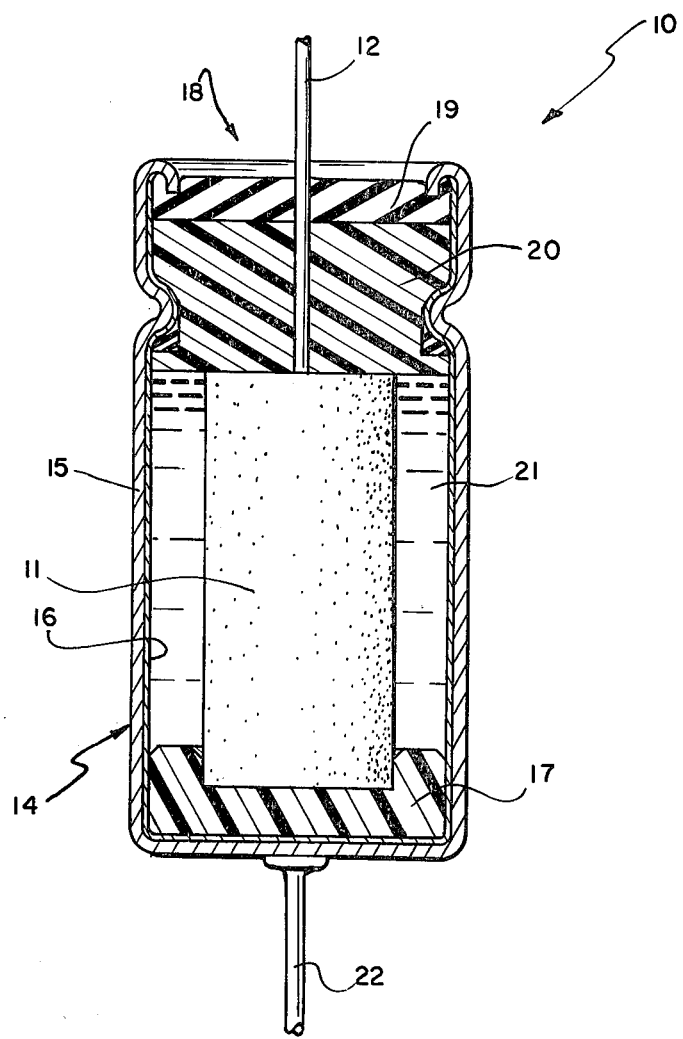

CATHODE DEPOLARIZER

SUMMARY OF THE INVENTION

The present invention relates to electrical devices, and more particularly, to an electrical device with a cathode depolarizer including a copper salt and a cathode electrode including a porous layer of electrically conductive metal containing material.

While the present invention is discussed hereinafter with reference to electrolytic capacitors, it is to be understood that the invention may be utilized in other types of electrical devices that include a cathode electrode with a porous layer of electrically conductive metal containing material and a reducible electrolyte.

An electrolytic capacitor in which the invention may be used includes a cathode electrode, an electrically conductive inorganic acid electrolyte, and a porous metal anode electrode having formed thereon a dielectric oxide film of the metal of the anode. The cathode electrode may be either silver, copper, or alloys of these metals in the form of a container or case capable of retaining an electrolyte, which is of an acidic nature, without harmful dissolution or corrosion thereof by the electrolyte. The interior of the cathode case is furnished with a porous layer of a highly conductive metal containing material such as platinum, palladium, gold, ruthenium or rhodium which is also resistant to harmful dissolution or corrosion thereof by the electrolyte. The electrolyte is an aqueous solution of a highly electrically conductive inorganic acid such as sulfuric acid ($H_2SO_4$), perchloric acid ($HClO_4$) or hydrochloric acid (HCL), preferably a 36 to 40 wt. % solution or gel of sulfuric acid. The anode is composed of a dielectric oxide film-forming metal such as tantalum, aluminum, titanium, zirconium or niobium, preferably tantalum.

BACKGROUND OF THE INVENTION

The anode and cathode electrodes of a capacitor each possess inherent asymmetric electrically conducting properties and the two electrodes are series-opposed in the capacitor structure. Under the influence of a pulsating voltage, the electrodes charge and discharge alternately, that is, one of the electrodes charges as the other electrode discharges. As a consequence, the electrolyte between the electrodes is at a negative potential with respect to the charging electrode throughout each pulse. The relation governing the admittance of the capacitor [1/C (device) = 1/C (anode) + 1/C (cathode), where C is capacitance)] results in the electric charge transfer being limited by the smaller of the two capacitances, that is, either the capacitance of the anode electrode or the capacitance of the cathode electrode.

In polar electrolytic capacitors, particularly as to capacitor rating, the design thereof is preferably established by the design parameters of the anode electrode. Therefore, the capacitance of the cathode electrode should be orders of magnitude higher than the capacitance of the anode electrode so as to be compatible with the anode electrode design. If the capacitance of the cathode electrode is orders of magnitude higher than the capacitance of the anode electrode, the term 1/C (cathode) in the above relation becomes small relative to the capacitance of the anode electrode and the device capacitance is essentially equal to the anode electrode capacitance. Ideally, the operating characteristics of such a capacitor approach optimum stability as the capacitance of the cathode electrode approaches infinity.

One way to increase the capacitance of the cathode electrode of an electrolytic capacitor includes applying to the surface of that electrode a porous layer of finely divided, substantially inert conductive material such as carbon or a metal such as platinum, palladium or gold. The porous layer increases the surface area of cathode electrode and, hence, the capacitance of that electrode. However, it is presently thought that the charge-discharge current is conducted across the electrolyte which separates the cathode and anode electrodes by the agency of the dissociated ions of the inorganic electrolyte. For example:

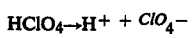

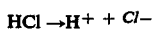

In operation of an electrical circuit, the anode electrode of an electrolytic capacitor is maintained at a positive DC bias voltage. This is necessitated by the aforementioned asymmetric character of the anode electrode. In the absence of a positive DC bias voltage negative ripple voltage pulses appear at the anode electrode which can cause current conduction through the relatively low forward resistance of this electrode. Thus, in practice, ripple voltages which are applied to a polar type electrolytic capacitor are superimposed on the positive DC bias voltage which the anode electrode sustains throughout electrical operation. This DC bias voltage, however, give rise to leakage current through defects in the anode dielectric layer and, generally speaking, the leakage current increases with increasing temperature and DC bias voltage. As leakage current is drawn through the series cathode electrode, certain electrochemical actions may occur at the cathode-electrolyte junction which can be detrimental to the overall device performance. For example, positive hydrogen ions may draw electrons from the cathode electrode to form neutral hydrogen gas bubbles some of which may cling to the cathode electrode to produce a layer of nonconducting gas around the cathode electrode. The base or basis metal surface of the cathode electrode may react with the negative ions of the inorganic electrolyte to form a neutral insoluble electrically insulating film such as silver sulfite ($Ag_2SO_3$) or silver sulfide ($Ag_2S$) where the base metal surface of the cathode electrode is silver covered with a porous layer of platinum, or perhaps copper sulfide (CuS) where the base metal surface of the container is copper covered with a porous layer of platinum. The insoluble insulating film and the hydrogen gas interfer with the operation of the capacitor in several ways. First, the film and gas bubbles each act to reduce the effective area of the cathode electrode so that the capacitance of the cathode electrode is undesirably reduced. Second, the insulating film on the cathode electrode harmfully increases the internal series resistance of the capacitor.

To help prevent the formation of an insoluble electrically insulating film and/or hydrogen gas at the cathode electrode, a depolarizer is added to the electrolyte. The aforementioned current flow at the cathode-electrolyte interface causes the depolarizer to be reduced prior to reduction of the inorganic acid of the electrolyte. The reduction of the depolarizer occurs prior to the reduction of the inorganic acid of the electrolyte because the decomposition potential of the metal ion of the depolarizer is lower than that of the hydrogen ion of the inorganic acid. For example, a silver sulfate depolarizer ($Ag_2SO_4$) in a sulfuric acid electrolyte has its molecule broken or reduced into positive silver ions ($2Ag^+$) and negative sulfate ions ($SO_4^{-2}$) by the flow of current across the electrolyte-cathode interface prior to current flow breaking or reducing the sulfuric acid molecule of the electrolyte into positive hydrogen ions ($2H^+$) and negative sulfate ions ($SO_4^{-2}$). Positive silver ions are deposited on the cathode electrode as silver metal or dissolved therefrom as silver ions depending on the direction of current flow at the electrolyte-cathode interface. In any regard, as long as silver sulfide depolarizer is present at the electrolyte-cathode interface, no electrolyte will be reduced to form harmful gaseous or film products on the cathode electrode surface because reduction of the depolarizer takes place prior to reduction of the electrolyte.

DESCRIPTION OF THE PRIOR ART

U.S. Pat. No. 2,616,953 granted to J. M. Booe discloses the addition of a silver sulfate depolarizer to a sulfuric acid electrolyte in an electrolytic capacitor with a tantalum anode and a silver cathode and to help prevent the formation of harmful gaseous and film products. However, in practice, it is found that use of a silver sulfate depolarizer tends to result in the deposition of silver metal on the anode electrode which tends to increase the DC leakage current of the capacitor and in the deposition of silver metal on the bottom of the case which deposit may grow sufficiently to provide an electrically conductive path between the anode and cathode electrodes thereby electrically short circuiting the capacitor.

U.S. Pat. No. 2,778,979 granted to J. M. Booe discloses the addition of a solid depolarizer of either silver sulfate or copper sulfate ($CuSO_4$) to an electrolyte of sulfuric acid in a capacitor having a tantalum anode and a silver or copper cathode. An ionically permeable barrier is interposed between the anode and cathode electrodes to help prevent short circuits between the cathode and the anode by the growth of the cathode.

U.S. Pat. No. 4,016,465 granted to Charles W. Walters discloses the addition of copper sulfate to an electrolyte to help prevent the formation of harmful gaseous and film products. The cathode electrode surface includes copper telluride, copper selenide or copper sulfide.

FEATURES OF THE INVENTION

A feature of the present invention is an electric device including a cathode electrode with a porous layer of metal containing material, a depolarizer capable of providing copper ions adjacent the cathode electrode when chemically reduced, i.e., a copper salt, and an electrolyte including an inorganic acid. The resultant electrical device is substantially non-film forming and non-gassing, offers minimal internal series resistance, stabilizes electrical characteristics of the capacitor and is substantially inert to corrosive chemical attack by the electrolyte. Various other features of this invention as well as many specific advantages will become more fully apparent from a detailed consideration of the remainder of this disclosure including the examples and the appended claims in conjunction with the accompanying drawing, in which the figure is a cross-sectional view of a typical electrolytic, film-forming metal anode capacitor.

Generally speaking, the present invention comprehends an electrical device with a cathode electrode that includes a porous layer of electrically conductive material selected from platinum, palladium, gold, ruthenium or rhodium containing materials, a cathode depolarizer capable of furnishing copper ions when chemically reduced, i.e., a copper salt, and an electrolyte including an inorganic acid contacting the anode and cathode electrode electrodes. The invention is particularly adapted for use in electrolytic, film-forming metal anode capacitors where a high cathodic capacitance and stable electrical characteristics are desired.

As previously indicated, the present invention can be utilized in various electrical devices but will be discussed hereinafter with reference to its application in electrolytic capacitors although not limited thereto. The main advantage realized by the utilization of the claimed combination of elements is stabilized operation of the electrical device over other known electrical devices.

DETAILED DESCRIPTION OF THE INVENTION

The invention may be better understood with reference to the drawing.

The FIGURE is a cross-sectional view of an electrolytic capacitor 10 containing a dielectric oxide film-forming metal anode electrode 11 and an anode riser 12. The anode electrode 11 has over its surface a dielectric oxide film or layer (not shown) of an oxide of the metal of the anode. The cathode electrode 14 includes an open ended cathode case 15 which serves as part of the housing for capacitor 10. The cathode electrode 14 also includes a porous layer 16 of metal containing material over the interior surface of the cathode case 15. The anode electrode 11 is retained within the cathode case 15 by means of an electrically insulative bottom spacer 17 and end seal assembly 18 which closes the open end of the cathode case 15. End seal assembly 18 is shown as a resilient electrically insulative closure member 19 in conjunction with a resilient electrically insulative spacer 20. The end seal assembly forms no part of the present invention and, as is known in the art, a wide variety of different type of structures may be employed to close the open end of the cathode case 15. Electrolyte 21 contacts the porous cathode layer 16 and the non-porous interior surface of the cathode case 15. External electrical termination for the cathode electrode may be provided by cathode lead 22.

The electrolyte 21 for the capacitor 10 is typically an aqueous solution or gel of an inorganic acid such as sulfuric acid ($H_2SO_4$), perchloric acid ($HClO_4$), hydrochloric acid (HCl), and the like. The presently preferred electrolyte is a 37 to 39 wt.% gel of sulfuric acid. To help prevent corrosion of the interior surfaces of the cathode case 15 by the action of the electrolyte 21, preferably the electrolyte is deaerated by means such as refluxing in a closed system before being added to the capacitor 10.

The cathode case 15 of the cathode electrode 14 is of a non-porous metal of either silver or copper or a non-porous metal alloy of either an alloy of silver or copper. Preferred case materials include either a silver-based or a copper-based material, that is, a material containing at least 50 wt.% silver or copper (as the case may be). A more preferred case material is either a silver-based or copper-base material which contains at least 90% silver or copper. One particularly advantageous material is argentiferous copper, CDA No. 116, which is a copper based alloy containing about 25 troy ounces of silver per ton of copper, or about 0.1 wt.% silver. This copper alloy has desirable mechanical properties such as ductility, retention of work-hardened temper over the operating temperature range of a typical capacitor, and good corrosion resistance.

The non-porous internal surface area of the cathode case 15 functions as part of the cathode electrode 14 of the capacitor 10. The surface area of the cathode electrode 14 is significantly increased (to increase its capacitance) by a porous layer of a metal containing material selected from the platinum, palladium, gold, ruthenium or rhodium so as to take full advantage of the capacitance of the anode 11. Any known conventional method may be used to form the porous layer 16 over the interior surface of the cathode case 15. Such method forms no part of the present invention and is known in the prior art. One such method includes the steps of masking, etching, rinsing, plating finely divided metal to form a porous layer 16 over the interior of the cathode case 15, rinsing and drying the porous layer 16. In the presently preferred method, the porous layer 16 is formed over the cathode case 15 prior to the introduction of the electrolyte 21 into the interior of the case 15.

A soluble copper salt depolarizer (not shown) is introduced to the electrolyte 21. Such a copper salt depolarizer helps to prevent the formation of harmful gaseous and film products during the operation of the capacitor 10. Copper sulfate is employed, preferably, in its hydrated form ($CuSO_4.5H_2O$), with the sulfuric acid electrolyte 21. The amount of copper salt used is typically from about 0.1 wt.% to about 5 wt.% of the electrolyte, with the presently preferred range of the copper salt being about 2 to 4 wt.% of the electrolyte.

Depolarization of the cathode electrode 14 is accomplished by reduction of the copper salt to copper ions. The reduction of copper salt occurs prior to reduction of inorganic acid of the electrolyte 20 because the decomposition potential of the copper ion is lower than that of the hydrogen ion. The cathodic reduction of copper ions to copper, in contrast with the formation of interfering matter such as gases as in the case of hydrogen ions drawing electrons from the cathode electrode 14 at the cathode, results in a double layer capacitance at the cathode electrode 14 of very large value. Such capacitance, derived from the reversible deposition of copper metal on the porous layer 16, cooperates with the capacitance established by the porous electrically conductive metal containing layer, and therefore enhances as well as stabilizes the overall cathode electrode capacitance. The double layer capacitance is sufficiently large as to result in a minor difference between device and anode electrode capacitance.

Surprisingly and unexpectedly, the presence of copper ions in the inorganic acid containing electrolyte 21 provides a low cathode potential and a large value double layer capacitance which is related to the character of the copper deposit. The deposit of copper metal from a copper sulfate depolarizer in an organic acid electrolyte is adherent to the cathode electrode 14 and is structurally sound when compared to the deposit of silver metal from a silver sulfate depolarizer in an inorganic acid electrolyte. Silver ions deposit from a $H_2SO_4$ electrolyte over the porous layer 16 as a spongy, bulky and structurally unsound mass of silver metal. In a capacitor design where there is minimum distance separating the anode electrode from the cathode electrode, a bulky growth of silver metal may result in electrically short-circuiting the anode and cathode electrodes. In addition abusive handling of a capacitor with a structurally unsound mass of silver metal may result in flaking of such mass and electrically short circuiting of the anode and cathode electrodes. The simple fact is that silver ions deposited from an inorganic acid electrolyte provide a spongy, bulky and structurally unsound mass. Furthermore, there is a tendency for silver ions to migrate to the anode electrode and degrade the tantalum pentoxide dielectric film through deposition of silver metal at defect sites in the dielectric. Tests of capacitors in which copper ions are included in the electrolyte show no harmful tendency toward dielectric degradation or short circuiting.

Several capacitors made according to this invention and performance data for these capacitors are presented hereinbelow. It should be understood that the below information is given for the purpose of illustration only and does not limit the invention.

GROUP I CAPACITORS

Three (3) 1500 μf capacitors each having a 6 volt rating are prepared according to the present invention.

Three (3) copper cathode cases are fabricated with a length of about ¾ inch (19.05 millimeters) and a diameter of about ⅜ inch (9.525 millimeters). The interior of each housing is cleaned with a warm detergent solution and rinsed with de-ionized water and the excess water is drained. A porous layer of platinum is formed over the interior of each case. A deaerated, gelled electrolyte of about 37 wt.% $H_2SO_4$ with the addition of about 3 wt.% $CuSO_4.5H_2O$ depolarizer is then placed in each case. A sintered tantalum anode with dielectric oxide coating and a length of about ½ inch (12.7 millimeters) and a diameter of about ⅓ inch (8.467 millimeters) is placed in the electrolyte-depolarizer mixture and the open end of each housing is sealed. These capacitors are hereinafter referred to as Group I capacitors.

GROUP II CAPACITORS

Five (5) 1500 μf capacitors each having a 6 volt rating are prepared according to the present invention.

The case is the same size as the housing utilized in Group I capacitors except that the case is silver. Again the case is cleansed by warm detergent solution and then rinsed with de-ionized water and drained. A porous layer of platinum is formed over the interior of each case. A deaerated, gelled electrolyte containing about 37 wt.% $H_2SO_4$ with about 3 wt.% $CuSO_4.5H_2O$ is placed in the housing. A sintered tantalum anode with a dielectric oxide film thereon is inserted into the electrolyte and the open end of the housing is closed by a seal assembly. The tantalum anode is the same size as the tantalum anode utilized in Group I capacitors. These capacitors are hereinafter referred to as Group II capacitors.

GROUP III CAPACITORS

Five (5) 1500 μf capacitors each having a 6 volt rating are prepared according to the present invention.

The case is the same size as the housing utilized in the Group II capacitors. The housing is prepared in the manner as stated in the preparation of Group II capacitors and a porous layer of platinum is formed over the interior of each case. An electrolyte consisting of a deaerated aqueous solution of about 37 wt.% $H_2SO_4$ with about 3 wt.% $CuSO_4.5H_2O$ is dispensed into the housing. A sintered tantalum anode with a dielectric oxide film thereon is inserted into the electrolyte and the open end of the housing is closed by a seal assembly. The tantalum anode is the same size as the tantalum anode utilized in Group II capacitors. These capacitors are hereinafter referred to as Group III capacitors.

GROUP IV CAPACITORS

Five (5) 1500 $\mu$f capacitors each having a 6 volt rating are prepared according to the following.

The case is the same size as the housing utilized in the Group II capacitors. The housing is prepared in the manner as stated in the preparation of Group II capacitors and a porous layer of platinum is formed over the interior of each case. After the housing is dry, electrolyte consisting of a deaerated aqueous solution of about 37 wt.% $H_2SO_4$ is dispensed into the housing. No $CuSO_4.5H_2O$ depolarizer was added to the electrolyte. A sintered tantalum anode with a dielectric oxide film thereon is inserted into the electrolyte and the open end of the case is closed by a seal assembly. The tantalum anode is the same size as the tantalum anode utilized in Group II capacitors. These capacitors are hereinafter referred to as Group IV capacitors.

The above capacitors are life tested at 125° C. and are found to have the following properties initially and after 2,000 hours.

| Group | No. Units | Initial Cap $\mu$f | After Age Cap $\mu$f | After 2000 Hrs % Cap (av.) | After 2000 Hrs DCL $\mu$A |
|---|---|---|---|---|---|
| I | 3 | 1820–1890 | 1560–1890 | − 3.8 | 1.7–1.9 |
| II | 5 | 1510–1610 | 1500–1610 | −11.4 | 1.5–1.6 |
| III | 5 | 1520–1670 | 1500–1620 | − 3.4 | 1.1–1.6 |
| IV | 5 | 1500–1740 | 1360–1620 | −20.8 | 1.2–1.7 |

A definite improvement in capacitance stability is realized in capacitors using a copper sulfate depolarizer with an inorganic acid containing electrolyte as compared to the Group IV capacitors which did not use such a depolarizer.

While the present invention is described with reference to particular embodiments thereof, it will be understood that numerous modifications may be made by those skilled in the art without actually departing from the spirit and scope of the invention as defined in the appended claims.

What is claimed is:

1. An electrical device stabilized for long life operation comprising a cathode electrode including a porous layer of electrically conductive metal containing material, an electrolyte including an inorganic acid contacting the cathode electrode, and a cathode depolarizer including copper ions reducible to copper metal by current flow prior to reduction of the inorganic acid.

2. The electrical device of claim 1, wherein the porous layer of electrically conductive metal containing material is selected from the group consisting of platinum, palladium, gold, ruthenium and rhodium.

3. The electrical device of claim 2, wherein the cathode depolarizer is about 0.1 wt.% to about 5 wt.% of the electrolyte.

4. The electrical device of claim 3, wherein the cathode depolarizer includes a copper salt.

5. The electrical device of claim 4, wherein the electrical device is an electrolytic capacitor with an electrolyte containing $H_2SO_4$ and a dielectric oxide film-forming metal porous anode.

6. The electrical device of claim 4, wherein said copper salt is $CuSO_4.5H_2O$.

7. The electrical device of claim 1, wherein the cathode electrode contains about 90 wt. % to about 100 wt. % silver.

8. The electrical device of claim 1, wherein the porous layer of electrically conductive metal comprises platinum.

9. The electrical device of claim 2, wherein the cathode depolarizer is about 2 wt. % to about 4 wt. % of the electrolyte.

10. A method for improving the depolarizing of an electrical device having a silver-based cathode electrode with a porous layer of electrically conductive metal containing material thereon comprising the steps of contacting the silver-based cathode electrode with an electrolyte including an inorganic acid and a depolarizer having copper ions, and depositing copper on the silver-based cathode electrode.

11. The method of claim 10 wherein the silver-based cathode electrode contains about 90 to 100 weight % silver.

12. The method of claim 10 wherein the depolarizer includes a copper salt.

13. The method of claim 12, including the further step of dissolving copper metal as copper ions from the cathode after deposition as a result of a reversal of the direction of current flow.

14. The method of claim 13, wherein the deposit of copper metal is adherent to the cathode electrode and is structurally sound.

* * * * *